(12) United States Patent
Saito et al.

(10) Patent No.: US 12,032,213 B1
(45) Date of Patent: Jul. 9, 2024

(54) OPTICAL CONNECTOR AND OPTICAL MODULE

(71) Applicant: Enplas Corporation, Saitama (JP)

(72) Inventors: Yuki Saito, Saitama (JP); Ayano Hinata, Saitama (JP); Honoka Nara, Saitama (JP)

(73) Assignee: Enplas Corporation, Saitama (JP)

( * ) Notice: Subject to any disclaimer, the term of this patent is extended or adjusted under 35 U.S.C. 154(b) by 10 days.

(21) Appl. No.: 18/067,952

(22) Filed: Dec. 19, 2022

(51) Int. Cl.
*G02B 6/38* (2006.01)

(52) U.S. Cl.
CPC ......... *G02B 6/3838* (2013.01); *G02B 6/3847* (2013.01); *G02B 6/3829* (2013.01)

(58) Field of Classification Search
None
See application file for complete search history.

(56) References Cited

U.S. PATENT DOCUMENTS

| | | | | |
|---|---|---|---|---|
| 7,027,692 B2 * | 4/2006 | Kitabayashi | ......... | G02B 6/3838 372/6 |
| 10,585,248 B2 * | 3/2020 | Childers | ............. | G02B 6/3853 |
| 11,099,329 B1 * | 8/2021 | Psaila | ................ | G02B 19/0014 |
| 11,906,789 B2 * | 2/2024 | Haase | .................. | G02B 6/3869 |
| 2001/0026673 A1 * | 10/2001 | Matsumoto | ......... | G02B 6/3636 385/137 |
| 2003/0053208 A1 * | 3/2003 | Hata | ..................... | G02B 6/2746 359/484.03 |
| 2012/0251052 A1 * | 10/2012 | Hsu | ...................... | G02B 6/3885 385/74 |
| 2018/0239092 A1 * | 8/2018 | Childers | ............. | G02B 6/3853 |
| 2022/0050250 A1 | 2/2022 | Asada | | |
| 2024/0012205 A1 * | 1/2024 | Hinata | ................ | G02B 6/3858 |

FOREIGN PATENT DOCUMENTS

JP   2020-101738 A   7/2020

* cited by examiner

*Primary Examiner* — Jerry Rahll
(74) *Attorney, Agent, or Firm* — Shih IP Law Group, PLLC

(57) ABSTRACT

An optical connector for optically coupling optical transmission members to each other includes a first optical portion, a second optical portion, and a groove extending in one direction for disposing the optical transmission member in such a way that at least part of the end surface of the optical transmission member contacts the first optical portion. In the optical connector, in a cross section including the axis of the groove and an optical path between the first optical portion and the second optical portion, the angle between a surface of the first optical portion contacting the end surface of the optical transmission member and the axis of the groove is less than 90°.

10 Claims, 21 Drawing Sheets

OPTICAL CONNECTOR AND OPTICAL MODULE

TECHNICAL FIELD

The present invention relates to an optical connector and an optical module.

BACKGROUND ART

Optical connectors for optically coupling optical transmission members to each other are known. An optical connector is configured to house the end portion of an optical transmission member. Two optical connectors each housing the end portion of an optical transmission member are coupled to each other while being positioned, for example, by fitting. The end portions of the two optical transmission members are positioned relative to each other, thereby optically coupling the optical transmission members to each other.

For example, Patent Literature (hereinafter, referred to as PTL) 1 describes a connector system for optically coupling a multi-core fiber and a single-core fiber. The connector system described in PTL 1 includes a first ferrule holding the end portion of the multi-core fiber, a second ferrule holding the end portion of the single-core fiber, and a guide pin for connecting the first ferrule and the second ferrule. Insertion holes for inserting guide pins are formed in the first ferrule and the second ferrule, respectively.

In the connector system described in PTL 1, the guide pins are inserted into the insertion holes disposed so as to face each other while the first ferrule and the second ferrule face each other, thereby connecting the first ferrule and the second ferrule to optically couple the multi-core fiber and the single-core fiber.

CITATION LIST

Patent Literature

PTL 1
Japanese Patent Application Laid-Open No. 2020-101738

SUMMARY OF INVENTION

Technical Problem

FIG. 1 is a schematic cross-sectional view illustrating a state in which an optical connector, as described in PTL 1, holds the end portion of an optical transmission member. As illustrated in FIG. 1, the end surface of optical transmission member 11 is in contact with the optical surface (first optical portion 16) of optical connector 12.

Light emitted from the end surface of optical transmission member 11 is incident on the optical surface (first optical portion 16) of optical connector 12. However, part of the light emitted from the end surface of optical transmission member 11 may be reflected by the optical surface of optical connector 12 and return to the end surface of optical transmission member 11. For preventing the reflected light from entering optical transmission member 110, the end surface of optical transmission member 11 may be inclined as illustrated in FIG. 1.

In addition, optical connector 12 is typically molded in a mold; thus optical connector 12 may be formed into a shape having inclination that serves as a draft for releasing the molded optical connector 12 from the mold. Specifically, the optical surface (first optical portion 16), on which the light from optical transmission member 11 is incident, may be inclined in optical connector 12 as illustrated in FIG. 1.

For positioning the end portion of optical connector 12 with respect to first optical portion 16 of the optical connector as described above, the end surface of optical transmission member 11 is placed so as to abut against first optical portion 16 of optical connector 12 as indicated by the arrow in FIG. 1.

However, when the positioning is made in this manner, optical transmission member 11 may move upward along the inclined surface of first optical portion 16 as indicated by the upward arrow in FIG. 1. As a result, the end portion of optical transmission member 11 cannot be positioned at the correct position, thus the positional accuracy of optical transmission member 11 with respect to optical connector 12 may decrease.

An object of the present invention is to provide an optical connector capable of preventing a decrease in positional accuracy when positioning the end portion of an optical transmission member with respect to the optical connector. Another object of the present invention is to provide an optical module including the optical connector.

Solution to Problem

An optical connector according to an embodiment of the present invention is an optical connector for optically coupling optical transmission members, and includes: a holding part for holding an end portion of an optical transmission member that is one of the optical transmission members; a first optical portion for allowing light from an end surface of the optical transmission member held by the holding part to enter an inside of the optical connector, or for emitting light traveling through the inside of the optical connector toward the end surface of the optical transmission member; and a second optical portion for allowing light from another optical connector holding another optical transmission member of the optical transmission members to enter the inside of the optical connector, or for emitting light traveling through the inside of the optical connector toward the other optical connector, wherein the holding part includes a groove for disposing the optical transmission member in such a way that at least part of the end surface of the optical transmission member contacts the first optical portion, the groove extending in one direction, and in a cross section including an axis of the groove and an optical path between the first optical portion and the second optical portion, an angle between a surface of the first optical portion and the axis of the groove is less than 90°, the surface contacting the at least part of the end surface of the optical transmission member.

An optical module according to an embodiment of the present invention includes an optical transmission member and the above optical connector, and the at least part of an end surface of the optical transmission member is in contact with the first optical portion of the optical connector.

Advantageous Effects of Invention

The present invention can provide an optical connector capable of preventing a decrease in positional accuracy when positioning the end portion of an optical transmission member with respect to the optical connector. In addition, the present invention can provide an optical module including the optical connector.

DESCRIPTION OF EMBODIMENTS

Hereinafter, an optical connector and an optical module according to an embodiment of the present invention will be described in detail with reference to the drawings.

Embodiment 1

Configuration of Optical Module

Figure 2:
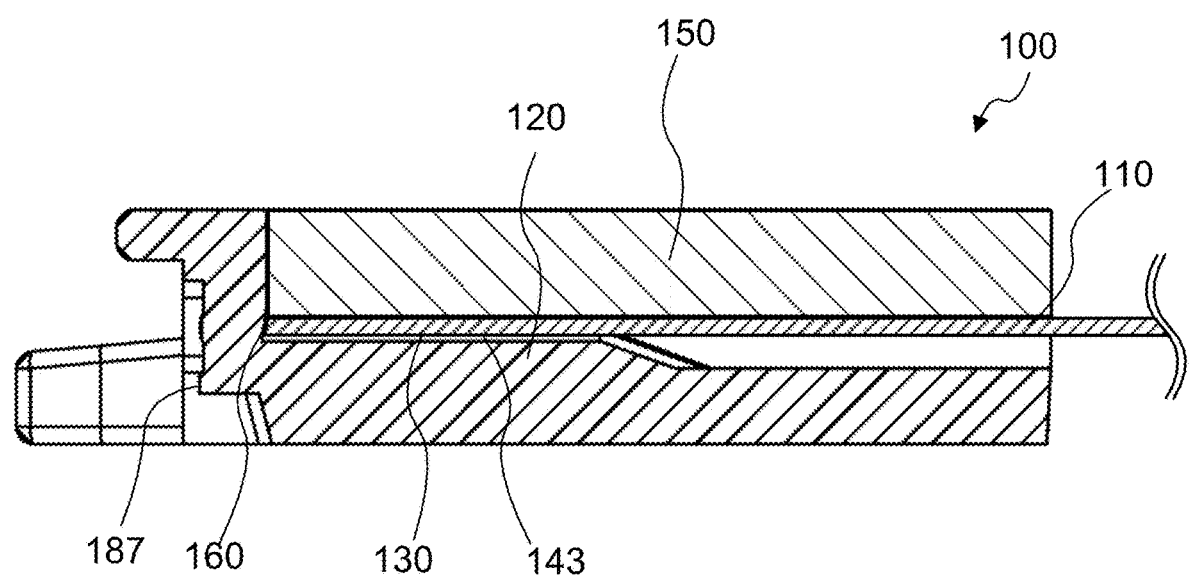
FIG. 2 is a cross-sectional view illustrating an optical module according to Embodiment 1.

FIG. 2 is a cross-sectional view illustrating the configuration of optical module 100 according to Embodiment 1 of the present invention.

As illustrated in FIG. 2, optical module 100 according to the present embodiment includes optical transmission members 110 and optical connector 120. Optical module 100 is used with a plurality of optical transmission member 110 connected to optical connector 120. Two optical modules 100 are used in a set (used in a pair). With respect to one optical module 100 whose optical connector holds a plurality of optical transmission members, the other optical module 100 whose optical connector holds a plurality of different optical transmission members 110 is turned upside down, then the optical connectors having the same shape are connected to each other, thereby optically coupling the plurality of optical transmission members with the plurality of different optical transmission members 110.

The type of optical transmission member 110 is not limited. Examples of optical transmission member 110 include optical fibers and optical waveguides. The number of optical transmission members 110 is not limited as long as the number is more than one. In the present embodiment, the number of optical transmission members 110 is 16. Optical transmission members 110 are disposed on holding part 130 of optical connector 120. Optical transmission members 110 are fixed to optical connector 120 by the following procedure: the end surfaces of optical transmission member 110 are placed so as to abut against first optical portion 160, an adhesive is applied while optical transmission members 110 are in contact with first optical portion 160, and lid 150 presses optical transmission members 110. In the present embodiment, optical transmission members 110 are optical fibers. The optical fiber may be single mode or multimode. The end surface of optical transmission member 110 is inclined so as to correspond to below described first optical portion 160 of optical connector 120, and the end surface is configured to abut against first optical portion 160. That is, the inclination angle of the end surface of optical transmission member 110 is preferably the same as the inclination angle of first optical portion 160 with respect to the axis of groove 143.

The number of optical transmission members 110 is not limited as long as the number is more than one. In the present embodiment, the number of optical transmission members 110 is 16. The end portion of optical transmission member 110 is fixed to optical connector 120.

Configuration of Optical Connector

Figure 3:
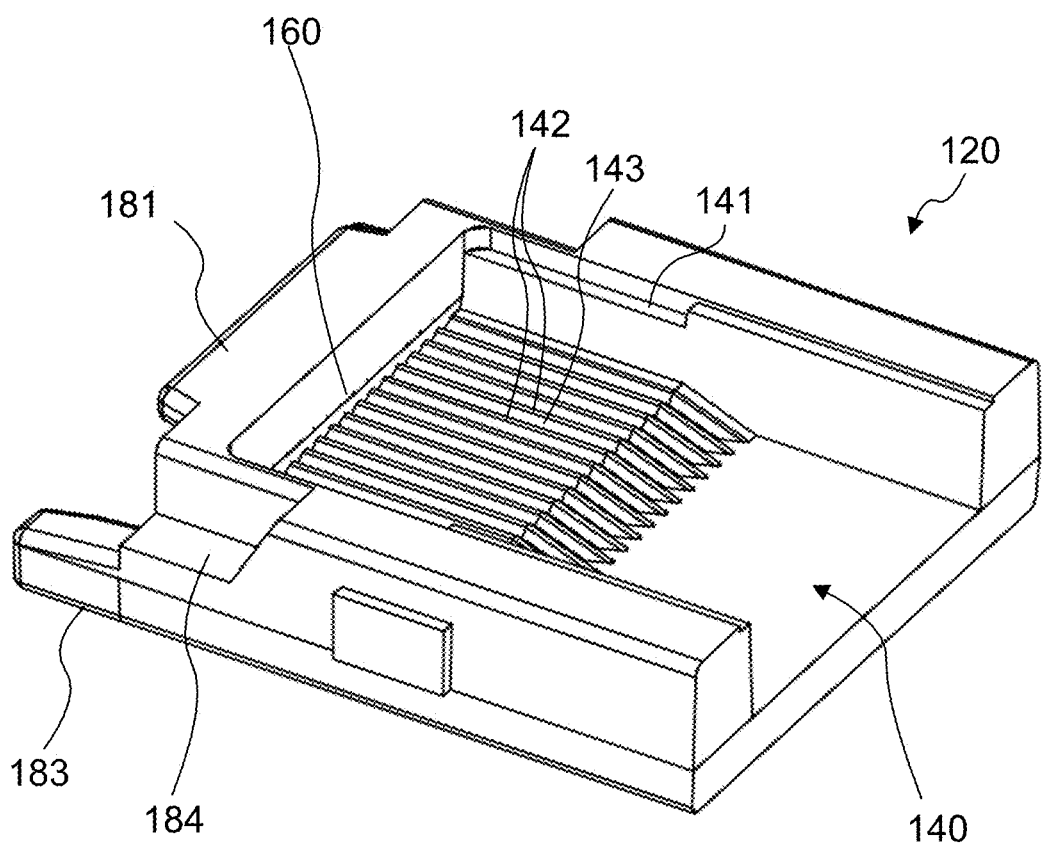
FIG. 3 is a perspective view illustrating an optical connector according to Embodiment 1.
Figure 3:
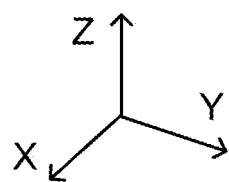
Figure 4A:
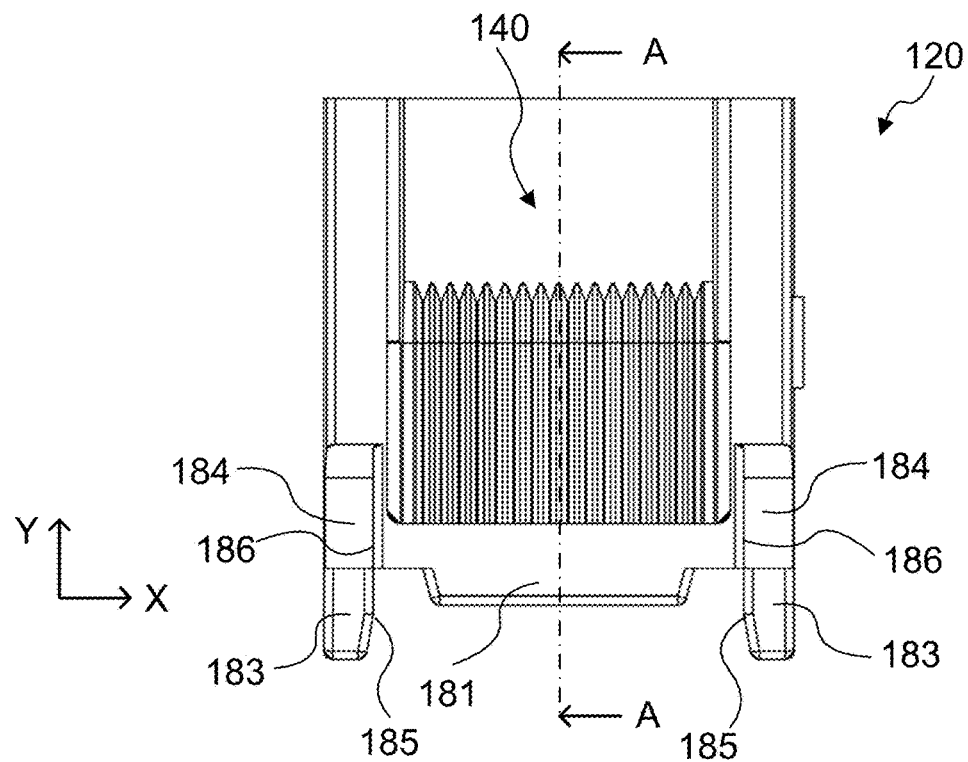
FIG. 4A is a plan view and FIG. 4B is a bottom view both illustrating the optical connector according to Embodiment 1.
Figure 4B:
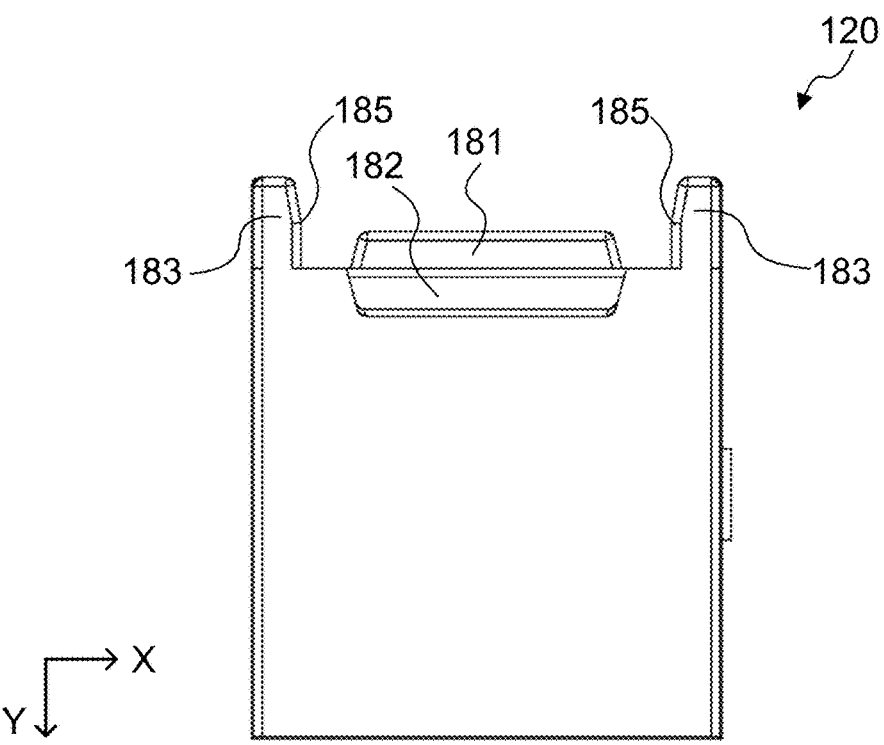
Figure 5A:
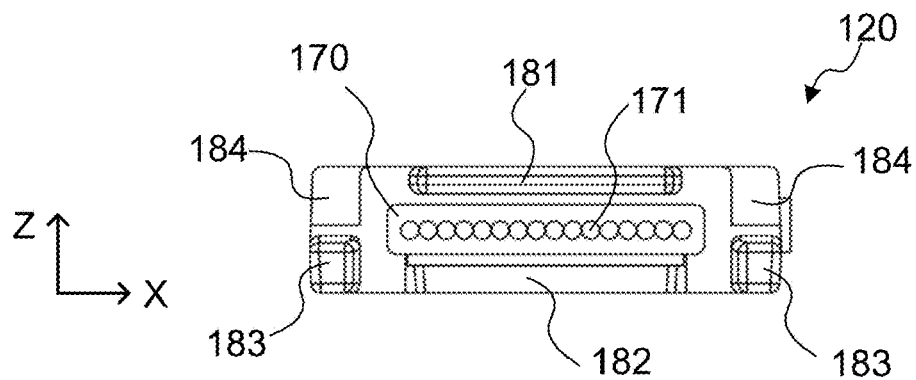
FIG. 5A is a front view.
Figure 5B:
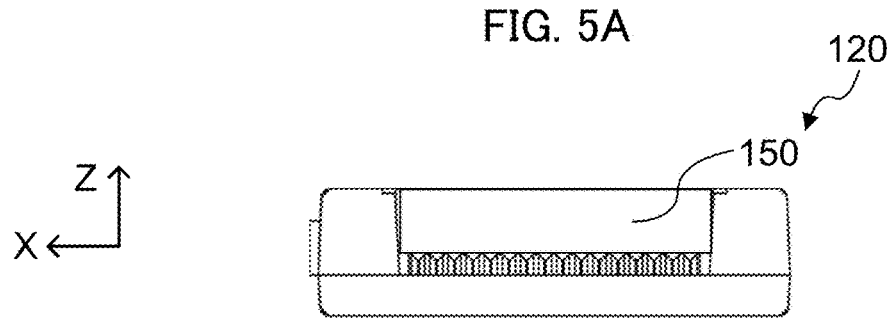
FIG. 5B is a rear view.
Figure 5C:
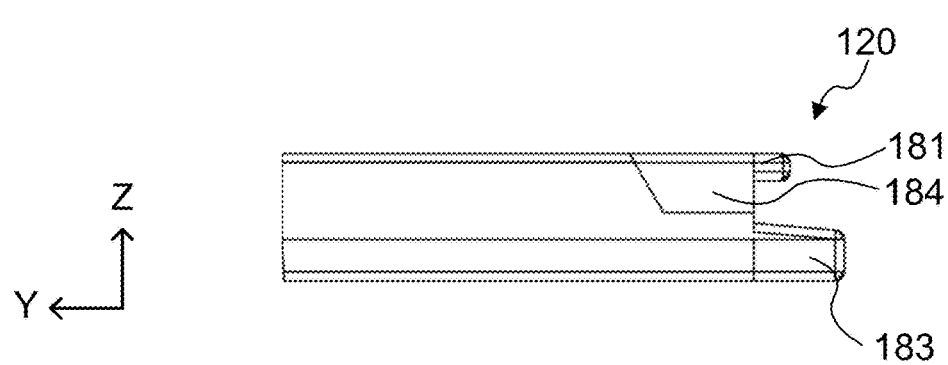
FIG. 5C is a left side view.
Figure 5D:
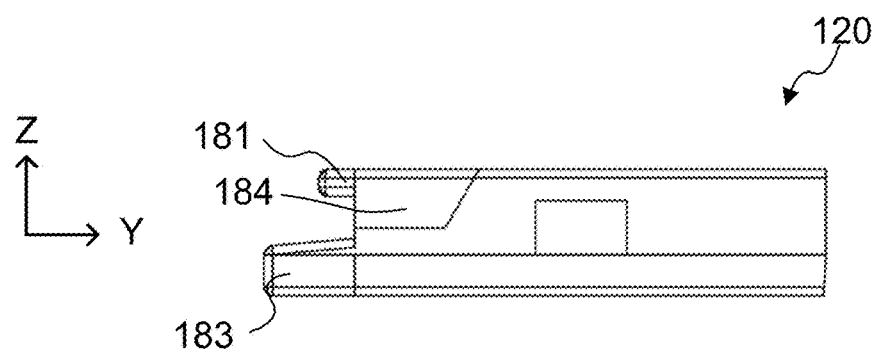
FIG. 5D is a right side view all illustrating the optical connector according to Embodiment 1.
Figure 6A:
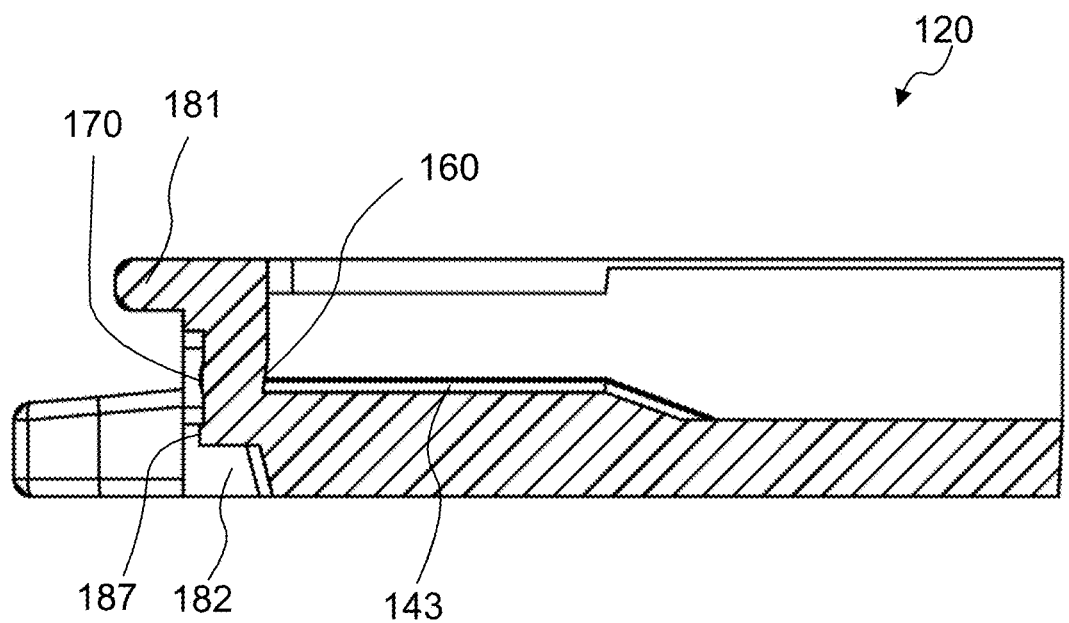
FIGS. 6A and 6B are cross-sectional views illustrating the optical connector according to Embodiment 1.
Figure 6B:
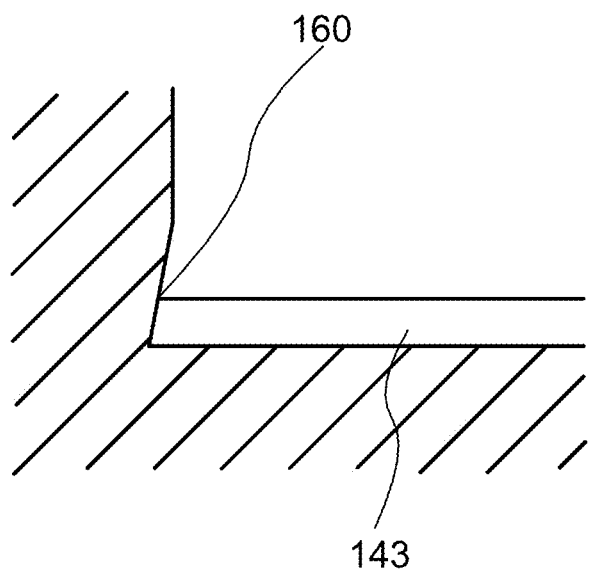

FIG. 3 is a perspective view of optical connector 120 without lid 150 according to Embodiment 1 of the present invention. FIG. 4A is a plan view and FIG. 4B is a bottom view both illustrating optical connector 120 without lid 150 according to Embodiment 1 of the present invention. FIG. 5A is a front view, FIG. 5B is a rear view, FIG. 5C is a left side view, and FIG. 5D is a right side view all illustrating optical connector 120 according to Embodiment 1 of the present invention. FIG. 6A is a cross-sectional view taken along line A-A of FIG. 4A, and FIG. 6B is an enlarged view of part of FIG. 6A.

In the following description, a "first direction" or the "X direction" is defined as a direction in which optical transmission members 110 are disposed in parallel (namely, the direction in which convex surfaces 171 of second optical portion 170 are arranged); a "second direction" or a "Z direction" is defined as a direction orthogonal to the X direction when second optical portion 170 is viewed from the front (namely, the direction when viewed along the optical path between two optical connectors 120); and a "third direction" or a "Y direction" is defined as a direction orthogonal to the X direction and the Z direction.

As illustrated in FIGS. 2 to 5D, optical connector 120 is a substantially rectangular parallelepiped member. Optical connector 120 includes holding part 130, first optical portion 160, and second optical portion 170. In the present embodiment, optical connector 120 includes protrusion 181, recess 182, engaging protrusions 183, and engaging recesses 184 in addition to the above components.

Optical connector 120 is formed from a material that allows transmission of light of wavelengths used for optical communications. Examples of the material for optical connector 120 include polyetherimide (PEI) such as ULTEM and transparent resins such as cyclic olefin resins. Optical connector 120 may be produced, for example, by injection molding.

Holding part 130 is configured to hold optical transmission members 110. Holding part 130 may have any configuration as long as the holding part can hold optical transmission members 110. Holding part 130 may be configured to press optical transmission members 110 to hold optical transmission members 110 or may be configured to allow insertion of optical transmission members 110 to hold the optical transmission members. In the present embodiment, holding part 130 include recess 140 for holding (herein also referred to as "holding recess 140") and lid 150, and is configured to press optical transmission members 110 to hold optical transmission members 110 disposed in holding recess 140.

Holding recess 140 opens onto the top surface and the rear surface of optical connector 120. Holding recess 140 may have any shape in plan view as long as the plurality of optical transmission members 110 can be disposed at appropriate positions. In the present embodiment, the plan view shape of holding recess 140 is rectangular. Notches 141 are disposed at both ends of holding recess 140 in the first direction (X direction) for disposing lid 150 at a predetermined position. This configuration can prevent disposed lid 150 from coming off in the third direction (Y direction).

In the present embodiment, a plurality of ridges 142 are disposed on the bottom surface of holding recess 140, and each groove 143 is formed between two ridges 142. Groove 143 extends in one direction, and a plurality of grooves 143 are disposed along the first direction (X direction). Groove 143 may have any configuration as long as disposing optical transmission member 110 along groove 143 can guide the end portion of optical transmission member 110, thereby allowing the end surface of optical transmission member 110 to contact first optical portion 160.

Grooves 143 may be disposed on the entire bottom surface of holding recess 140 or on a part of the bottom surface of holding recess 140. In the present embodiment, grooves 143 are disposed in a part of the bottom surface of holding recess 140 on the first optical portion 160 side. The number of grooves 143 is equal to or greater than the number of optical transmission members 110 to be installed. In the present embodiment, the number of grooves 143 is the same as the number of optical transmission members 110. That is, the number of grooves 143 is 16 in the present embodiment. Groove 143 may have any cross-sectional shape. Groove 143 may be a V-shaped groove or a U-shaped groove. In the present embodiment, groove 143 is a V-shaped groove. Groove 143 preferably has a depth such that the upper end portion of optical transmission member 110 protrudes from the upper end portion of groove 143 when optical transmission member 110 is disposed in groove 143. This configuration can prevent optical transmission members 110 from coming off when below-described lid 150 presses optical transmission members 110 toward groove 143.

In the present embodiment, the axis of groove 143 is positioned along the Y direction when optical connector 120 is cut along the YZ plane. That is, the axis of groove 143 is parallel to the back surface of optical connector 120.

Lid 150 presses optical transmission members 110 against grooves 143 of optical connector 120. Lid 150 is disposed to cover holding recess 140. Lid 150 may have any configuration as long as the lid can exhibit the above functions.

In the present embodiment, lid 150 includes lid body 151 and projections 152 (see FIGS. 8A and 8B below). Lid body 151 covers holding recess 140 from the top surface side of optical connector 120. Projections 152 are disposed at both ends of lid body 151 in the first direction and protrude toward the back side. The shape of the projection 152 is complementary to the shape of notch 141 disposed in holding recess 140.

In the present embodiment, the plurality of optical transmission members 110 are disposed on the plurality of grooves 143, and end surfaces of optical transmission members 110 are placed so as to abut against first optical portion 160. In this state, an adhesive is applied in such a way that no air layer interposes between the end surfaces of optical transmission members 110 and first optical portion 160. Lid 150 presses optical transmission members 110 toward the bottom surface of holding recess 140 before the adhesive is cured. By curing the adhesive in this state, optical transmission members 110 can be fixed to optical connector 120.

First optical portion 160 is disposed to face the end surfaces of the plurality of optical transmission members 110 held by holding part 130. First optical portion 160 allows thereon incidence of light emitted from optical transmission members 110 or allows therefrom emission of light toward the end surfaces of the plurality of optical transmission members 110. First optical portion 160 may have any shape as long as the first optical portion can exhibit the above functions. In the present embodiment, first optical portion 160 is a flat surface. First optical portion 160 is disposed on a part of the inner surface of holding recess 140.

In a cross section including an optical path between first optical portion 160 and second optical portion 170 and the axis of groove 143, that is, in a plane (ZY plane) including the second direction and the third direction, the angle between the surface of first optical portion 160 and the axis of groove 143 is less than 90°—the surface contacting the end surfaces of optical transmission members 110. The angle being less than 90° can prevent a decrease in positional accuracy when the end surfaces of optical transmission members 110 are pressed against first optical portion 160 to be positioned. Although the angle is not limited as long as it is less than 90°, the upper limit of the angle is preferably 88° or less. The lower limit of the angle is preferably 80° or more, more preferably 85° or more. In the present embodiment, the surface of first optical portion 160 contacting the end surfaces of optical transmission members 110 is inclined with respect to the back surface of optical connector 120, and the axis of each optical transmission member 110 is parallel to the back surface of optical connector 120, as illustrated in FIGS. 6A and 6B. In addition, in the present embodiment, the surface of first optical portion 160 contacting the end surfaces of optical transmission members 110 is inclined so as to approach second optical portion 170 as the surface approaches the back surface of optical connector 120.

Second optical portion 170 allows therefrom the emission of light incident on first optical portion 160 to the outside, or allows incidence thereon light from another optical connector. Second optical portion 170 may have any shape as long as the second optical portion can exhibit the above functions. Second optical portion 170 may be composed of a plurality of convex surfaces or may be a flat surface. In the present embodiment, second optical portion 170 includes a plurality of convex surfaces 171. Convex surfaces 171 are arranged in parallel in the first direction. Convex surface 171 allows therefrom the emission of light incident on first optical portion 160 toward another optical connector 120, or allows incidence thereon light from another optical connector 120. Second optical portion 170 is disposed on the front surface of optical connector 120. Convex surface 171 may have any shape in plan view. The plan view shape of convex surface 171 may be circular or rectangular. In the present embodiment, the plan view shape of convex surface 171 is circular. In addition, the number of convex surfaces 171 is the same as the number of optical transmission members 110. That is, the number of convex surfaces 171 is 16 in the present embodiment.

When second optical portion 170 is viewed from the front (when second optical portion 170 is viewed along the optical path between the optical connector 120 and another optical connector 120), protrusion 181 and recess 182 are disposed at respective positions symmetrical with respect to a reference straight line parallel to the first direction. In the present embodiment, when second optical portion 170 is viewed from the front (when second optical portion 170 is viewed along the optical path between the optical connector 120 and another optical connector 120), protrusion 181 and recess 182 are disposed in the second direction (Z direction) orthogonal to the first direction (X direction) with second optical portion 170 located therebetween. In the present embodiment, contact surface 187 in the front surface of optical connector 120 is a flat surface, and the contact surface is a portion on which second optical portion 170, protrusion 181 and recess 182 are not disposed. Contact surface 187 contacts contact surface 187 of another connector 120. Contact surface 187 may be disposed perpendicular to the back surface of optical connector 120, or may be inclined with respect to the back surface of optical connector 120. In the present embodiment, contact surface 187 is disposed perpendicular to the back surface of optical connector 120.

Protrusion 181 has a shape such that the protrusion can be fitted into recess 182 of another optical connector 120. In the present embodiment, protrusion 181 is disposed on the front side (upper side) of the front surface of optical connector 120. Protrusion 181 may have any shape as long as the protrusion can prevent the displacement of optical connector 120 in the second direction. In the present embodiment, protrusion 181 has a shape of a ridge elongated in the first direction (X direction).

Recess 182 has a shape such that the recess can be fitted with protrusion 181 of another optical connector 120. Recess 182 may have any shape as long as the recess exhibit the above functions. In the present embodiment, recess 182 is disposed on the back side (and lower side) of the front surface of optical connector 120. The recess may have any shape as long as the recess can prevent the displacement of optical connector 120 in the second direction.

In the present embodiment, protrusion 181 is disposed on the front surface side (upper surface side) of second optical portion 170, and recess 182 is disposed on the back surface side (lower surface side) of second optical portion 170. However, the disposed positions of the protrusion and the recess may be reversed. That is, recess 182 may be disposed on the front side of second optical portion 170 and protrusion 181 may be disposed on the back surface side of second optical portion 170. Protrusion 181 and recess 182 preferably have complementary shapes. When optical connector 120 is viewed from the front, protrusion 181 and recess 182 are preferably disposed symmetrically with respect to a virtual straight line passing through the center in the front-back direction and extending in the first direction.

Engaging protrusions 183 are disposed in optical connector 120 at the positions located on the back surface side at both ends in the first direction. Engaging protrusion 183 has a rectangular column shape protruding from the front surface of optical connector 120. Engaging protrusion 183 includes inward restricting surface 185 on the inner flat surface thereof.

Engaging recesses 184 open at the corners of optical connector 120 on the front surface (and upper surface) side at both ends in the first direction. Engaging recess 184 includes outward restricting surface 186 on the inner flat surface thereof.

When optical connector 120 is engaged with another optical connector 120, the positional restriction in the first direction (X direction) is achieved by the following configuration: at least the pair of inward restricting surfaces 185 of the optical connector respectively contact with the pair of outward restricting surfaces 186 of the other optical connector 120; and at least the pair of outward restricting surfaces 186 of the optical connector respectively contact with the pair of inward restricting surfaces 185 of the other optical connector 120.

Method of Using Optical Module

In the following, a method of using optical module 100 will be described with reference to FIGS. 7 to 8B.

Figure 7:
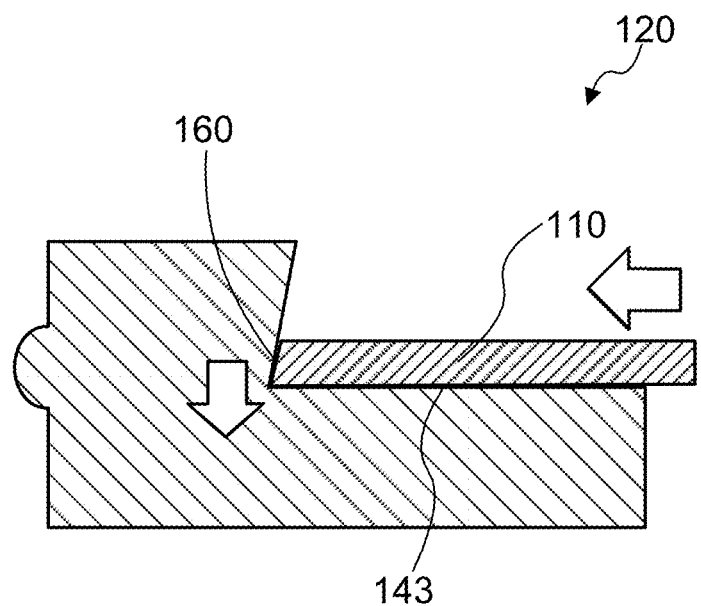
FIG. 7 is a schematic diagram illustrating how optical transmission members are positioned with respect to the optical connector according to Embodiment 1.

FIG. 7 schematically illustrates how optical transmission members 110 are positioned with respect to optical connector 120 according to Embodiment 1.

Figure 1:
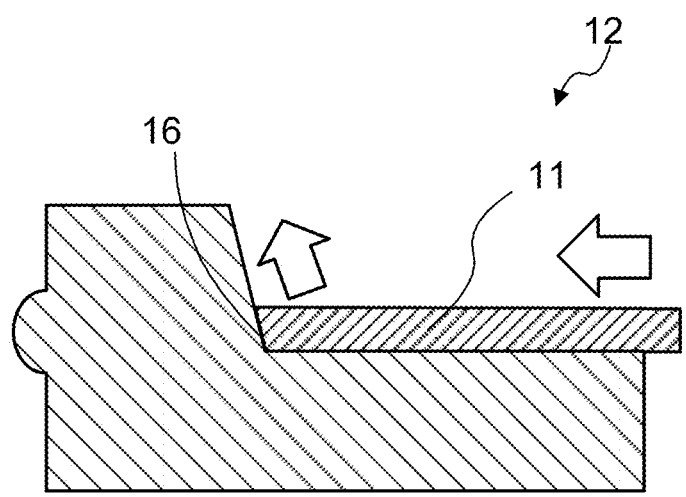
FIG. 1 is a cross-sectional view illustrating a conventional optical module.

In the present embodiment, even when optical transmission members 110 are placed so as to abut against first optical portion 160 of optical connector 120, a downward force is applied to optical transmission members 110, thereby preventing a decrease in the positional accuracy, as illustrated in FIG. 7 (see FIG. 1 for comparison). This is because the angle is less than 90° in optical connector 120 between the surface of first optical portion 160 contacting the end surfaces of optical transmission members 110 and the axis of each of grooves 143 for disposing optical transmission members 110.

Figure 8A:
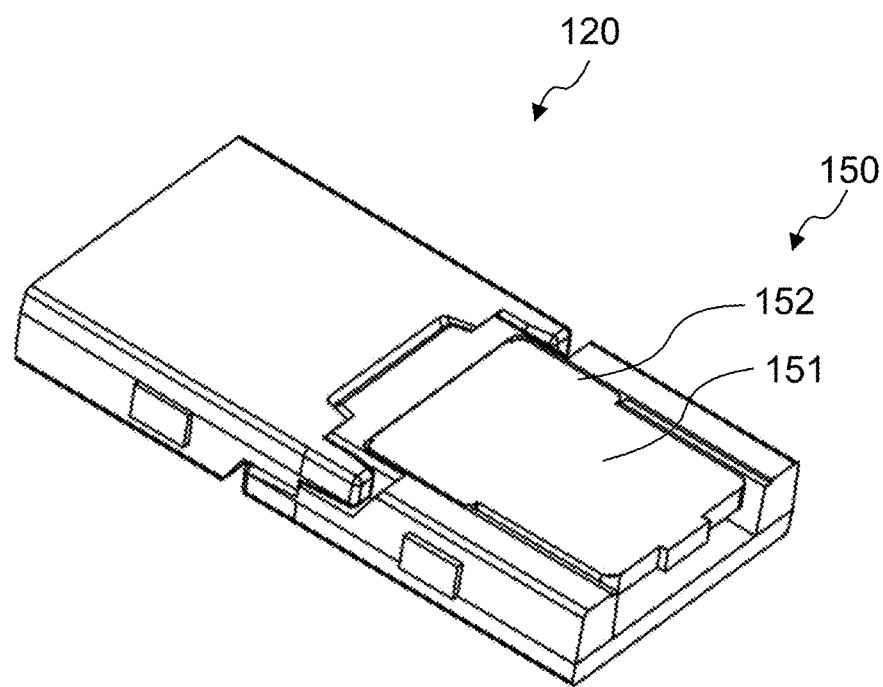
FIGS. 8A and 8B illustrate a state in which optical connectors 1 according to Embodiment 1 are connected to each other.
Figure 8B:
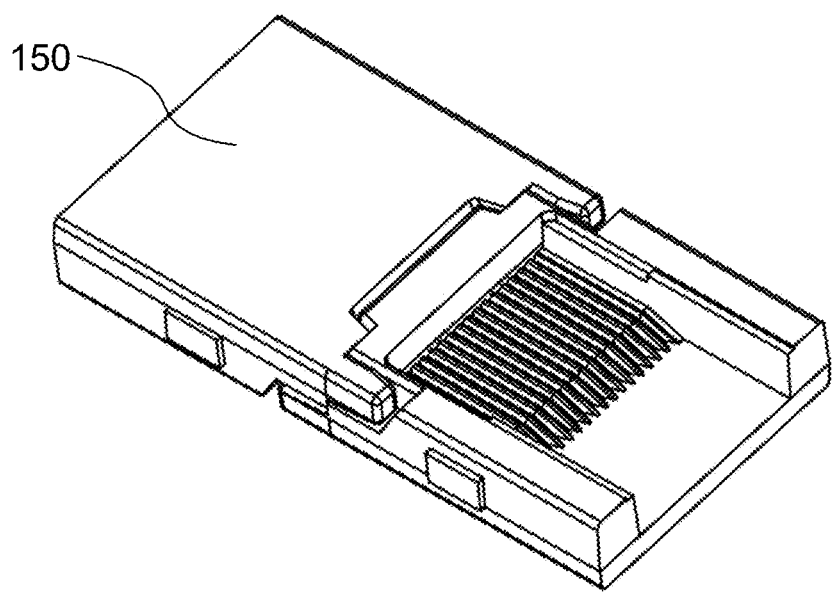

FIGS. 8A and 8B are perspective views illustrating a state in which optical modules 100 are connected to each other. FIGS. 8A and 8B omit optical transmission members 110.

As illustrated in FIGS. 8A and 8B, one of the optical modules (herein also referred to as "the one optical module") 100 is placed with its lid 150 facing upward, and the other one of the optical modules (herein also referred to as "the other optical module") 100 is rotated (turned upside down) about a straight line along the first direction as a rotation axis. Protrusion 181 of the one optical module 100 is engaged with recess 182 of the other optical module 100, and recess 182 of the one optical module 100 is engaged with protrusion 181 of the other optical module 100. This configuration can restrict displacement between the one optical module 100 and the other optical module 100 in the second direction (Z direction). In addition, engaging protrusions 183 of the one optical module 100 are engaged with engaging recesses 184 of the other optical module 100, and engaging recesses 184 of the one optical module 100 are engaged with engaging protrusions 183 of the other optical module 100. This configuration can restrict displacement between the one optical module 100 and the other optical module 100 in the first direction (X direction). As a result, the plurality of optical transmission members 110 connected to the one optical module 100 are optically coupled with the plurality of optical transmission members 110 connected to the other optical module 100 (herein also referred to as "the other plurality of optical transmission members 110").

Figure 9:
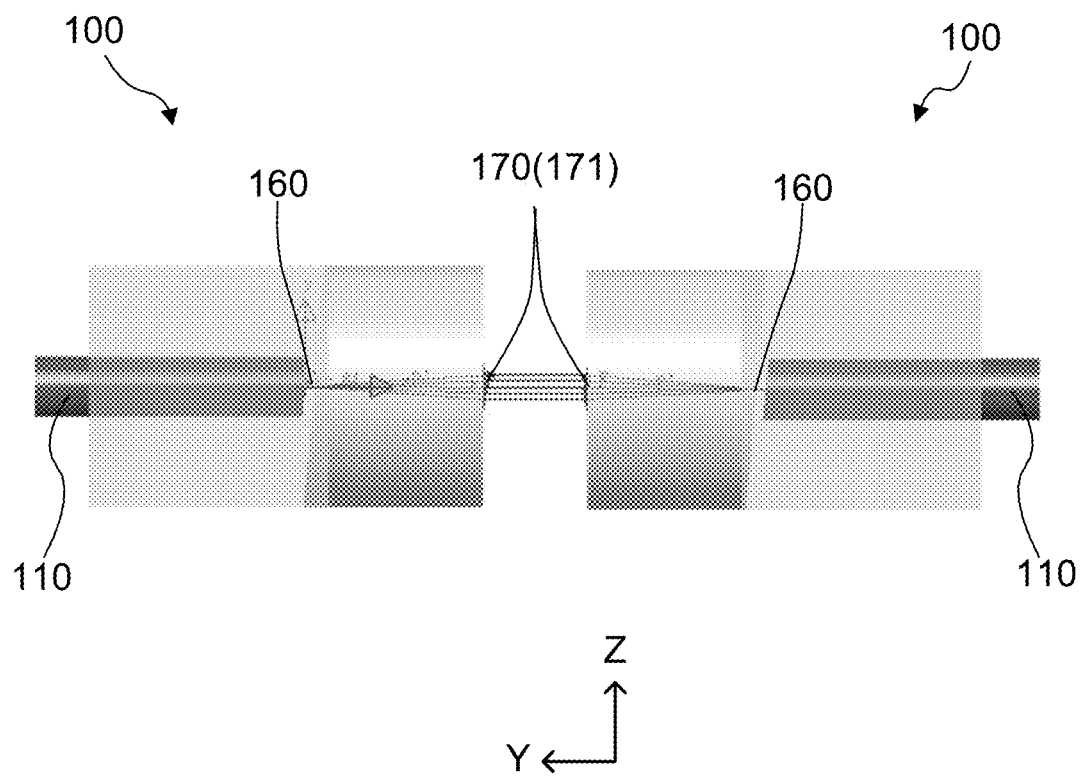
FIG. 9 illustrates optical paths in the optical module according to Embodiment 1.

In the following, optical paths between the one optical module 100 and the other optical module 100 will be described. FIG. 9 illustrates a state in which the one optical module 100 is connected with the other optical module 100, and the plurality of optical transmission members 110 are optically coupled with the other plurality of optical transmission members 110. FIG. 9 is a cross-sectional view in a plane (ZY plane) including the second direction and the third direction.

In the state in which the one optical module 100 is connected with the other optical module 100 as illustrated in FIG. 9, the central axis (the central axis of second optical portion 170 (convex surface 171)) of optical transmission member 110 of the one optical module 100 is not on the same straight line as the central axis (the central axis of second optical portion 170 (convex surface 171)) of optical transmission member 110 of the other optical module 100.

In the present embodiment illustrated in FIG. 9, the central axis (the central axis of second optical portion 170 (convex surface 171)) of optical transmission member 110 in the left side optical connector 120 with its back side facing up is slightly higher in the second direction (Z direction) than the central axis (the central axis of second optical portion 170 (convex surface 171)) of optical transmission member 110 in the right side optical connector 120 with its front side facing up.

In the present embodiment, the end surface of optical transmission member 110 and first optical portion 160 are not perpendicular to the second direction (Z direction), but are inclined; thus, traveling light is refracted. Therefore, in accordance with the above configuration as described above, the central axes of optical transmission members 110 are placed so as not to be on the same straight line (i.e., not to be on a single straight line), thereby optically coupling the two optical transmission members 110 with each other.

In the following, the travel of light when the two optical transmission members 110 are optically coupled with each other will be described.

Light emitted from the one of the optical transmission members 110 travels substantially horizontally and enters optical connector 120 from first optical portion 160. The light entering optical connector 120 is emitted from convex surface 171 of second optical portion 170. Light emitted from the one optical module 100 enters from the convex surface 171 of second optical portion 170 of the other optical module 100. The light entering optical connector 120 is emitted from first optical portion 160 and enters optical transmission member 110 fixed to the other optical module 100. When optical modules 100 according to the present embodiment are connected with each other, light emitted from optical transmission member 110 of one of the optical modules 100 travels substantially straight and reaches optical transmission member 110 of the other one of the optical modules 100.

Effect

In optical module 100 of the present embodiment, the angle between the surface of first optical portion 160 contacting the end surfaces of optical transmission members 110 and the axis of the groove is less than 90°. Therefore, it is possible to prevent a decrease in positional accuracy, which would be caused by the movement of optical transmission members 110 along the inclined surface during the positioning of the end portions of the optical transmission members with respect to the optical connector.

Embodiment 2

Configurations of Optical Module and Optical Connector

Hereinafter, optical module 200 according to Embodiment 2 will be described

Figure 10:
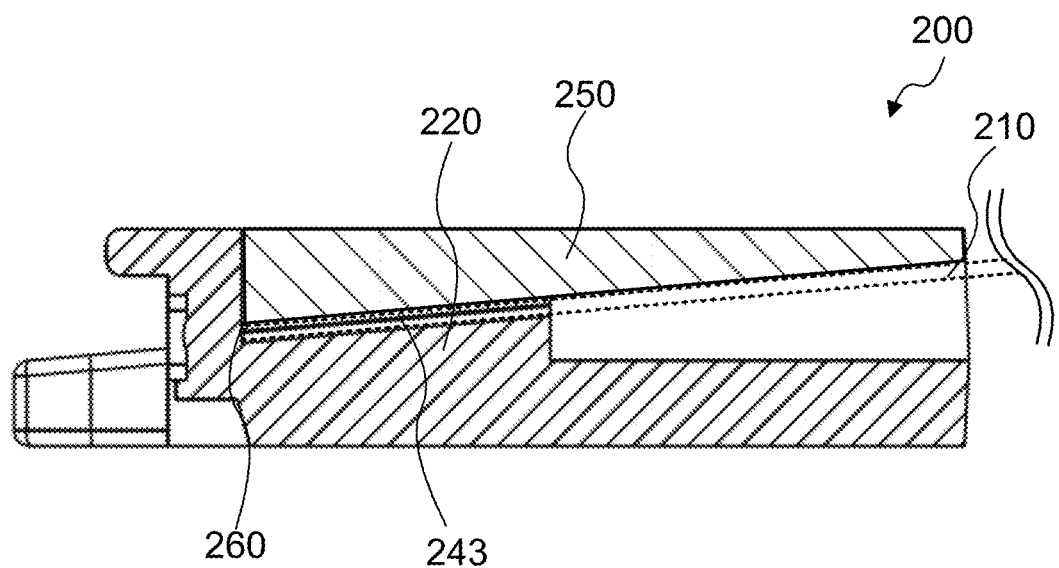
FIG. 10 is a cross-sectional view illustrating an optical module according to Embodiment 2.
Figure 11:
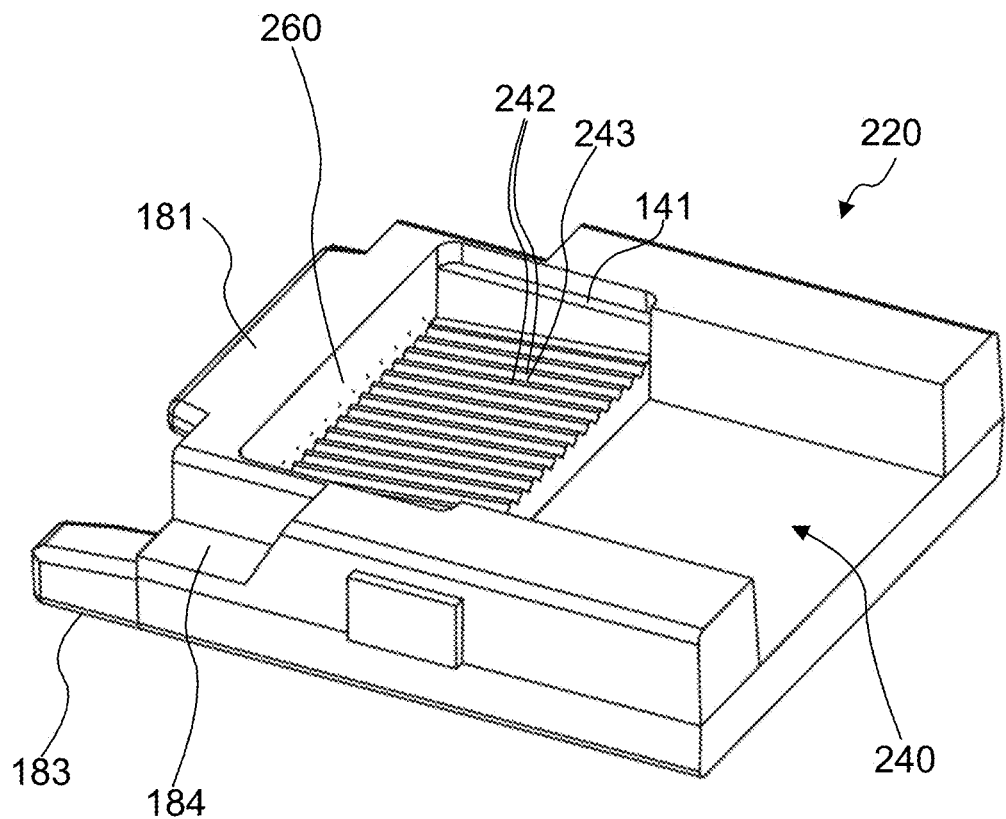
FIG. 11 is a perspective view illustrating an optical connector according to Embodiment 2.
Figure 12A:
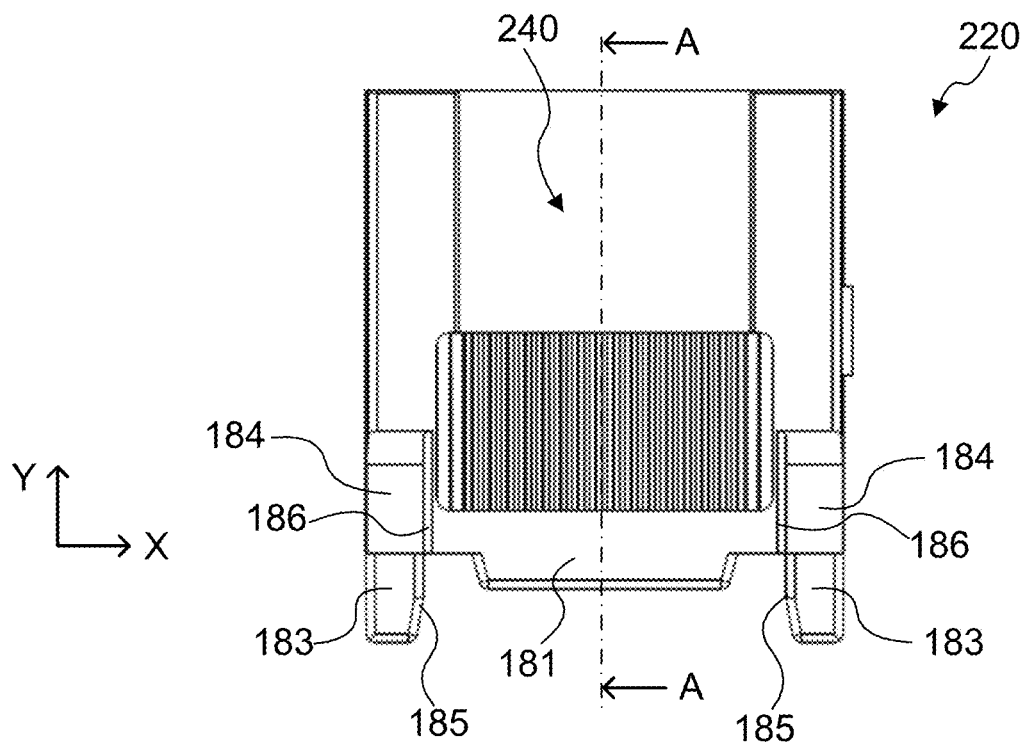
FIG. 12A is a plan view and FIG. 12B is a bottom view both illustrating the optical connector according to Embodiment 2.
Figure 12B:
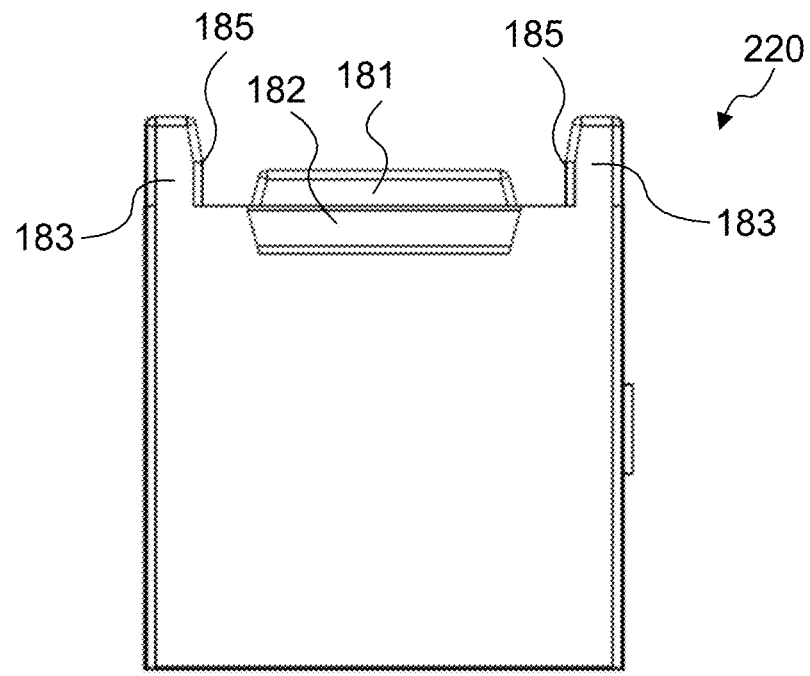
Figure 13A:
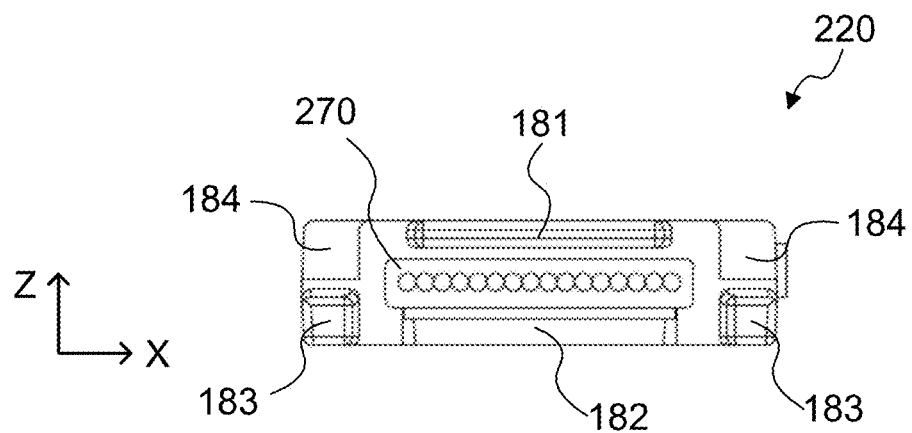
FIG. 13A is a front view.
Figure 13B:
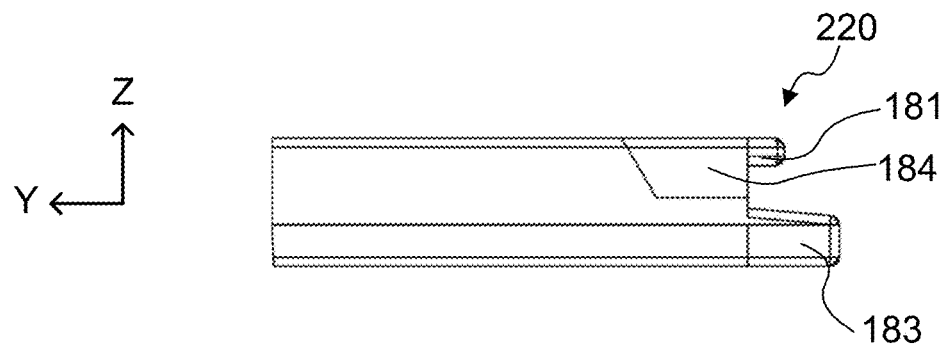
FIG. 13B is a left side view.
Figure 13C:
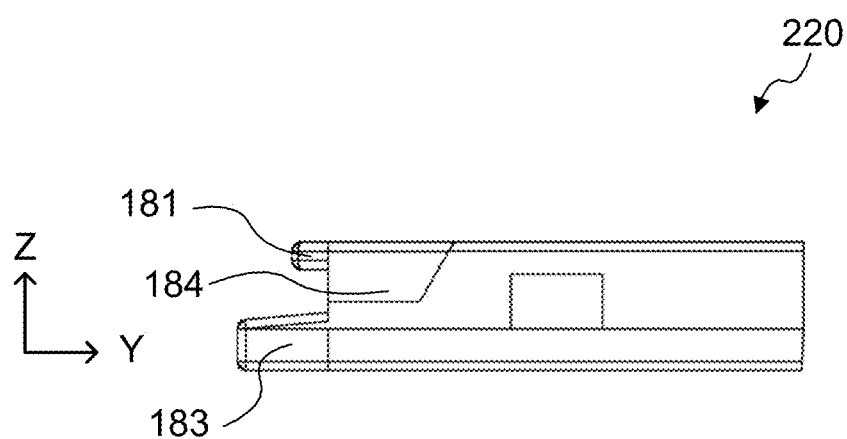
FIG. 13C is a right side view all illustrating the optical connector according to Embodiment 2.
Figure 14:
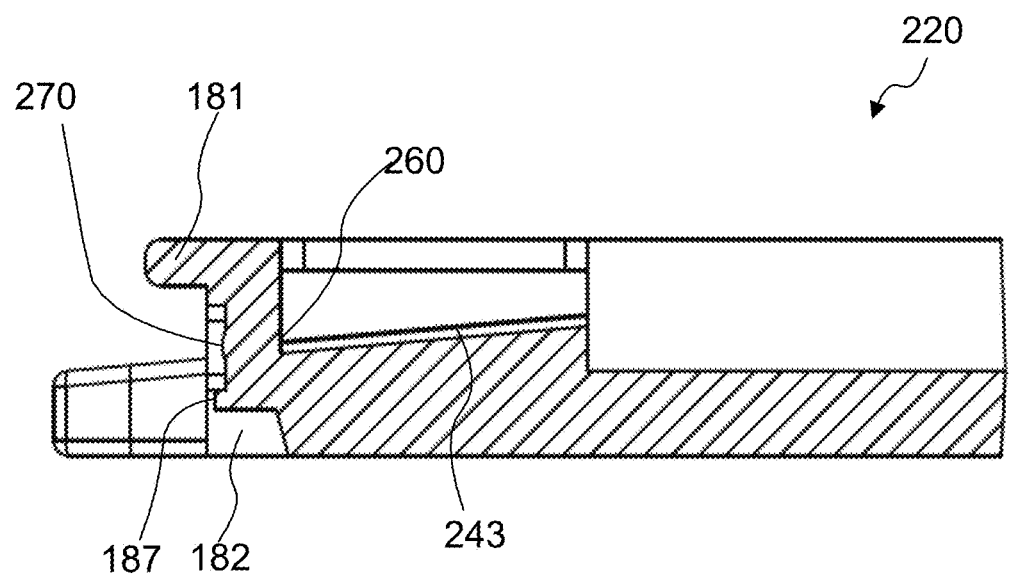
FIG. 14 is a cross-sectional view illustrating the optical connector according to Embodiment 2.

FIG. 10 is a cross-sectional view illustrating the configuration of optical module 200 according to Embodiment 2 of the present invention. FIG. 11 is a perspective view, FIG. 12A is a plan view, and FIG. 12B is a bottom view all illustrating optical connector 220 without lid 250 according to Embodiment 2 of the present invention. FIG. 13A is a front view, FIG. 13B is a left side view, and FIG. 13C is a right side view all illustrating optical connector 220 according to Embodiment 2 of the present invention. FIG. 14 is a cross-sectional view taken along line A-A of FIG. 12A. In optical module 200 and optical connector 220 according to Embodiment 2, the same reference numerals are given to the same configurations as in Embodiment 1, and the description thereof will be omitted.

In optical module 200 according to Embodiment 2, in a cross section including an optical path between first optical portion 260 and second optical portion 270 and the axis of groove 243, the angle between the surface of first optical portion 260 and the axis of a groove is less than 90°—the surface contacting the end surfaces of optical transmission members 210, as in optical module 100 according to Embodiment 1.

Optical module 200 mainly differs from optical module 100 according to Embodiment 1 in the following: the surface (contacting the end surfaces of optical transmission members 210) of first optical portion 260 of optical connector 220 is perpendicular to the back surface of optical connector 220; and the axis of groove 243 is inclined with respect to the back surface of optical connector 220. Specifically, in the present embodiment, the axis of groove 243 is inclined so as to approach the back surface of optical connector 220 as the axis approaches first optical portion 260.

Method of Using Optical Module

In the following, a method of using optical module 200 will be described with reference to FIGS. 15 and 16.

Figure 15:
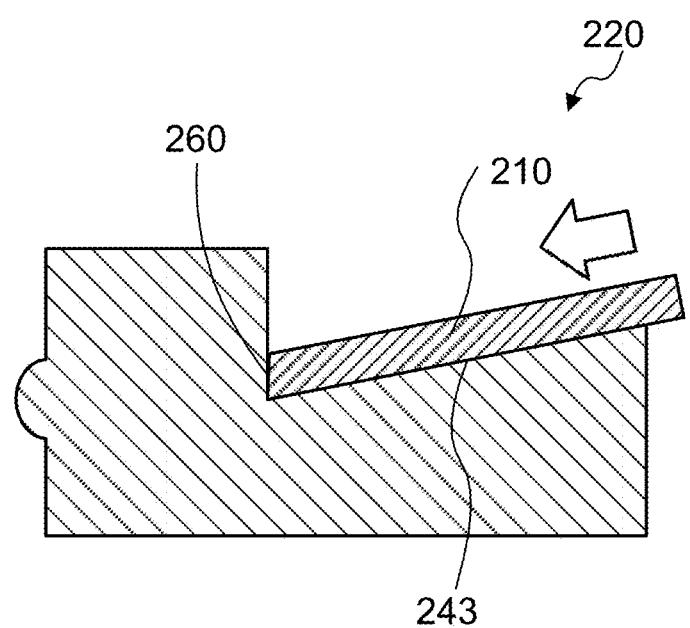
FIG. 15 is a schematic diagram illustrating how optical transmission members are positioned with respect to the optical connector according to Embodiment 2.

FIG. 15 schematically illustrates how optical transmission members 210 are positioned with respect to optical connector 220 according to Embodiment 2.

In the present embodiment, even when optical transmission members 210 are placed so as to abut against first optical portion 260 of optical connector 220, no upward force is applied to optical transmission members 210, thereby preventing a decrease in the positional accuracy, as illustrated in FIG. 15 (see FIG. 1 for comparison). This is because, also in optical connector 220 as optical connector 120, the angle is less than 90° between the surface of first optical portion 260 contacting the end surfaces of optical transmission members 210 and the axis of each of grooves 243 for disposing optical transmission members 210.

Figure 16:
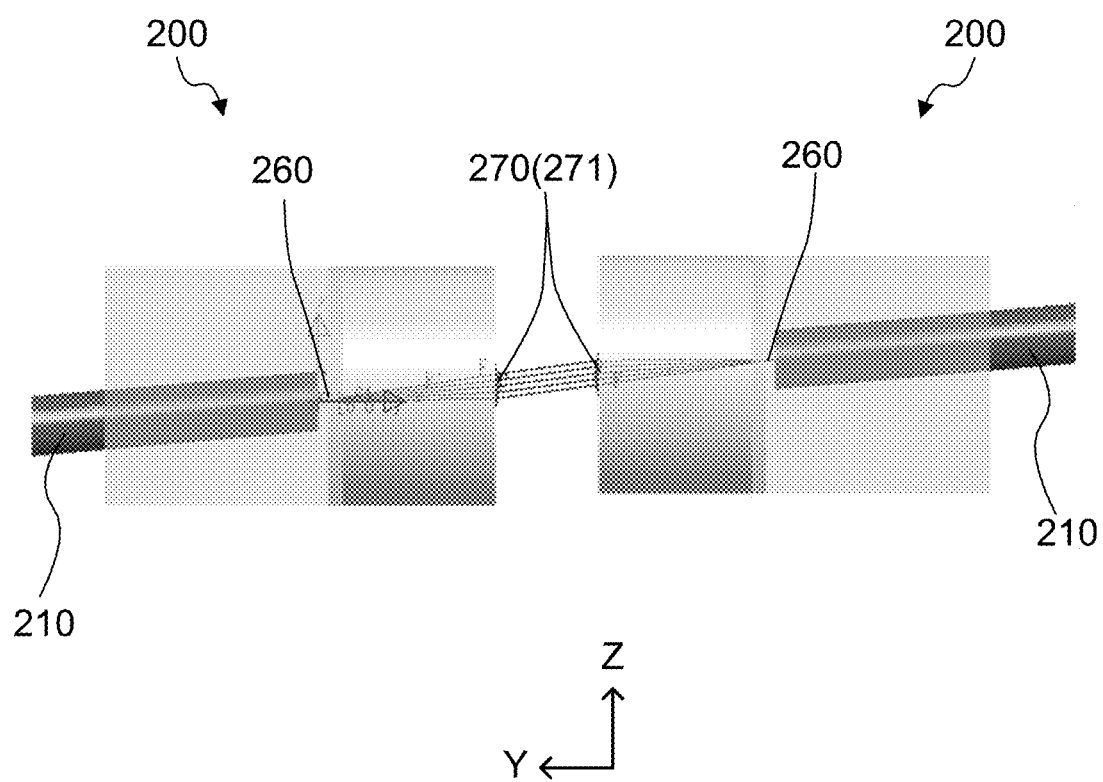
FIG. 16 illustrates optical paths in the optical module according to Embodiment 2.

FIG. 16 illustrates a state in which the one optical module 200 is connected with the other optical module 200, and the plurality of optical transmission members 210 are optically coupled with the other plurality of optical transmission members 210. FIG. 16 is a cross-sectional view in a plane (ZY plane) including the second direction and the third direction.

In the state in which the one optical module 200 is connected with the other optical module 200 as illustrated in FIG. 16, the central axis (the central axis of second optical portion 270 (convex surface 271)) of optical transmission member 210 of the one optical module 200 is not on the same straight line as the central axis (the central axis of second optical portion 270 (convex surface 271)) of optical transmission member 210 of the other optical module 200.

In the present embodiment illustrated in FIG. 16, the central axis (the central axis of second optical portion 270 (convex surface 271)) of optical transmission member 210 of the left side optical connector 220 with its back side facing up is a little lower in the second direction (Z direction) than the central axis (the central axis of second optical portion 270 (convex surface 271)) of optical transmission member 210 of the right side optical connector 220 with its front side facing up.

In the present embodiment, the axis of optical transmission member 210 is not perpendicular to the second direction (Z direction), but is inclined; thus, traveling light is refracted. Therefore, in accordance with the above configuration as described above, the central axes of optical transmission members 110 are placed so as not to be on the same straight line, thereby optically coupling the two optical transmission members 210 with each other.

Effect

In optical module 200 of the present embodiment, the angle between the surface of first optical portion 260 contacting the end surfaces of optical transmission members 210 and the axis of groove 243 is less than 90°. Therefore, it is possible to prevent a decrease in positional accuracy, which would be caused by the movement of optical transmission members 210 along the inclined surface during the positioning of the end portions of optical transmission members 210 with respect to optical connector 220. In addition, in the present embodiment, the surface of first optical portion 260 contacting optical transmission members 210 is perpendicular to the back surface of optical connector 220. Formation of first optical portion 260 as an undercut when releasing optical connector 220 is thus prevented, and optical connector 220 is easily released from the mold (easily released from the mold in the Z direction).

Variation

Hereinafter, variations having configurations applicable to the optical connector of the present invention will be described.

Figure 17A:
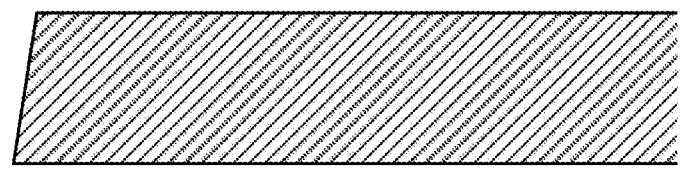
FIG. 17A illustrates an end surface of an optical transmission member cut with a blade.
Figure 17B:
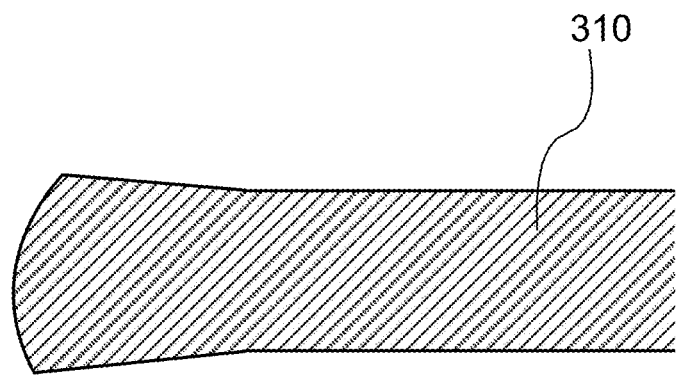
FIG. 17B illustrates an end surface of an optical transmission member cut with a laser.

FIG. 17A illustrates a cross-sectional view of an optical transmission member cut with a blade, and FIG. 17B illustrates a cross-sectional view of an optical transmission member 310 cut with a laser. These drawings omit the internal structure of the optical transmission member. As illustrated in FIG. 17A, the end surface of the optical transmission member cut with a blade is flat. As illustrated in FIG. 17B, meanwhile, the end surface of optical transmission member 310 cut with a laser may be curved (dome-shaped) and the vicinity of the end surface of optical transmission member 310 may swell due to the influence of heat during the cutting. The positional accuracy may decrease when the end surfaces of optical transmission members 310 having such a shape are positioned along the grooves so as to abut against first optical portion 160 of the optical receptacle.

The configurations of optical connector 320 according to the variation is for preventing such a decrease in positional accuracy as described above. These configurations are applicable to the optical connector of the present invention and applicable to both Embodiment 1 and Embodiment 2. A case in which these configurations are applied to Embodiment 1 will be described below as optical connector 320 according to the variation. In optical connector 320, the same reference numerals are given to the same configurations as in optical connector 120 according to Embodiment 1, and the description thereof will be omitted.

Figure 18A:
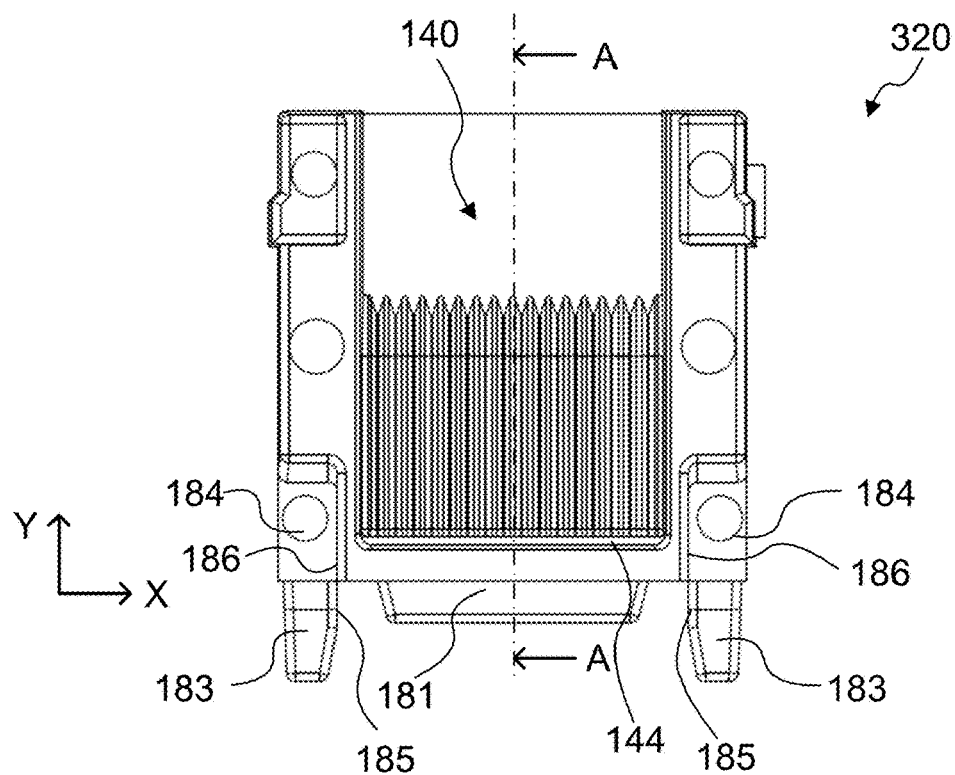
FIG. 18A is a plan view and FIG. 18B is a bottom view both illustrating an optical connector according to a variation.
Figure 18B:
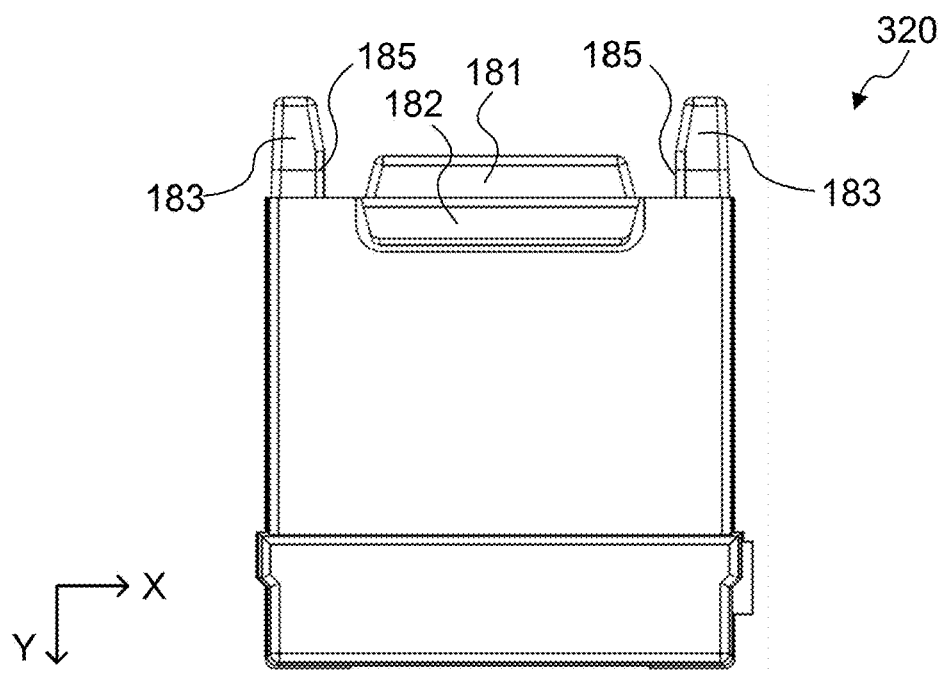
Figure 19A:
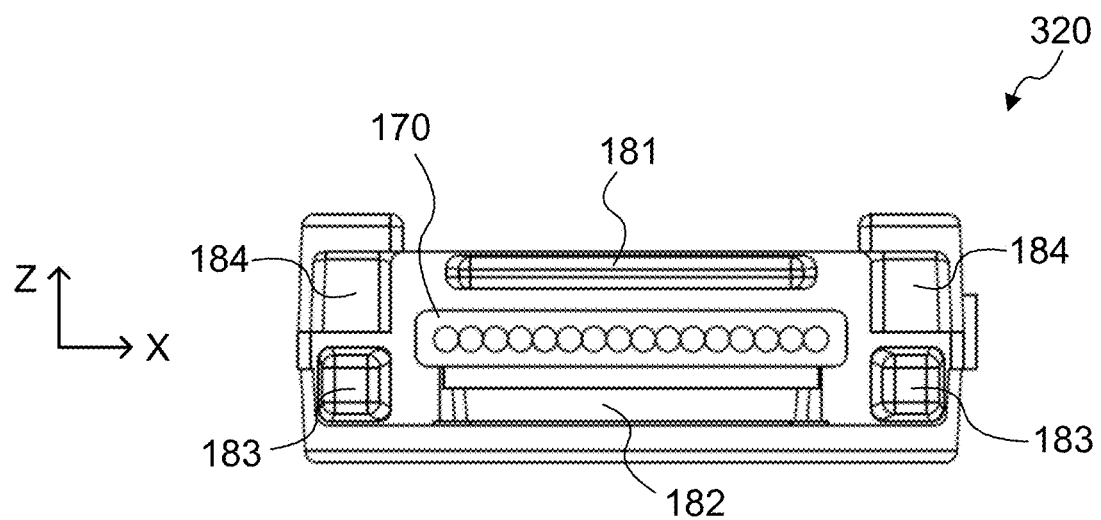
FIG. 19A is a front view and FIG. 19B is a rear view both illustrating the optical connector according to the variation.
Figure 19B:
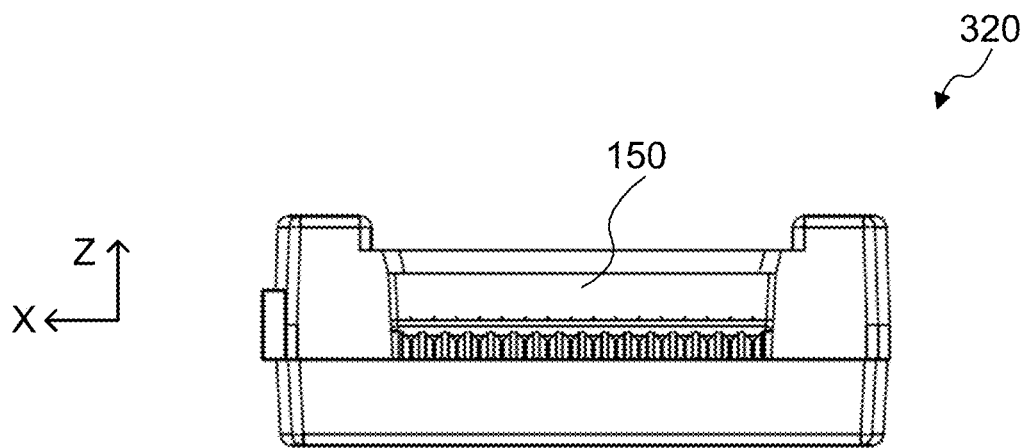
Figure 20A:
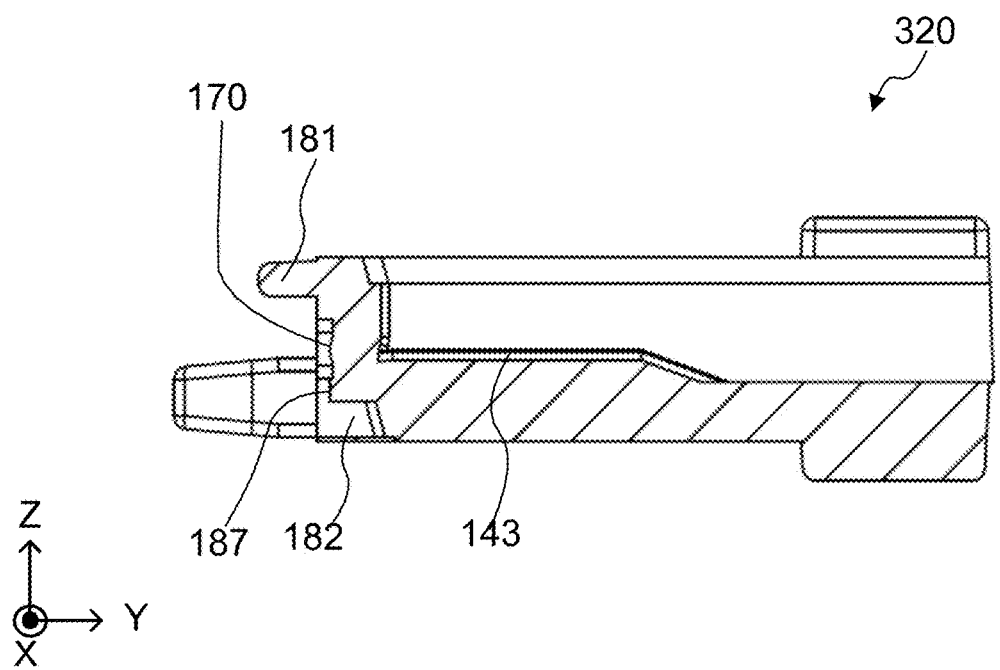
FIG. 20A is a cross-sectional view illustrating the optical connector according to the variation and FIG. 20B is an enlarged view of part of FIG. 20A.
Figure 20B:
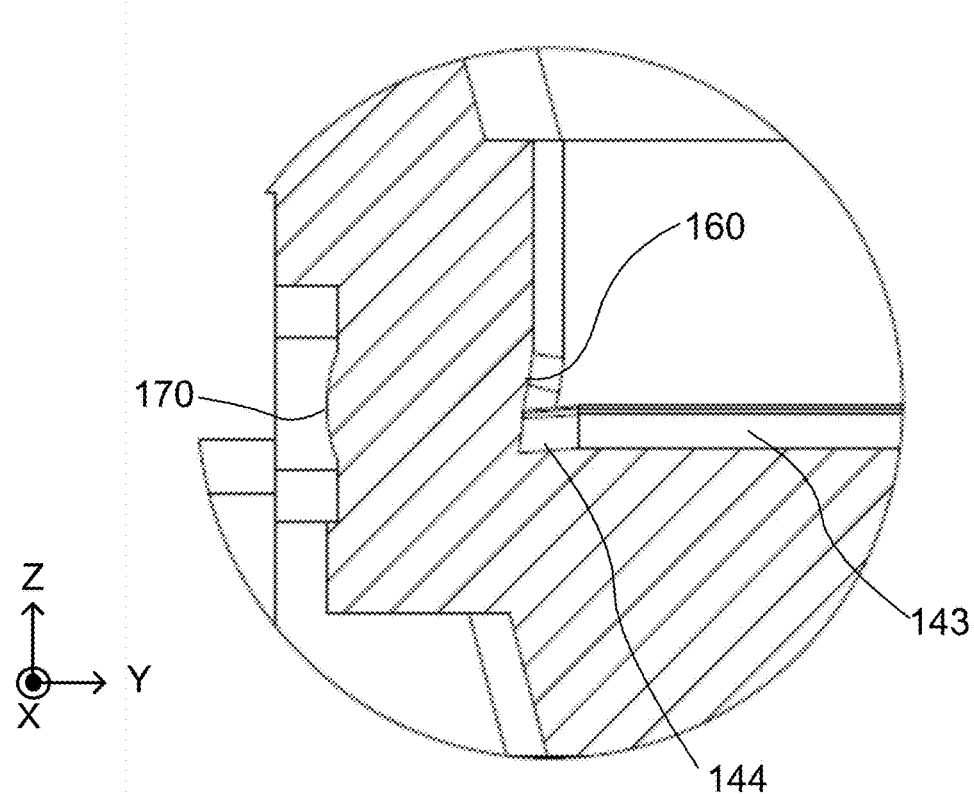
Figure 21A:
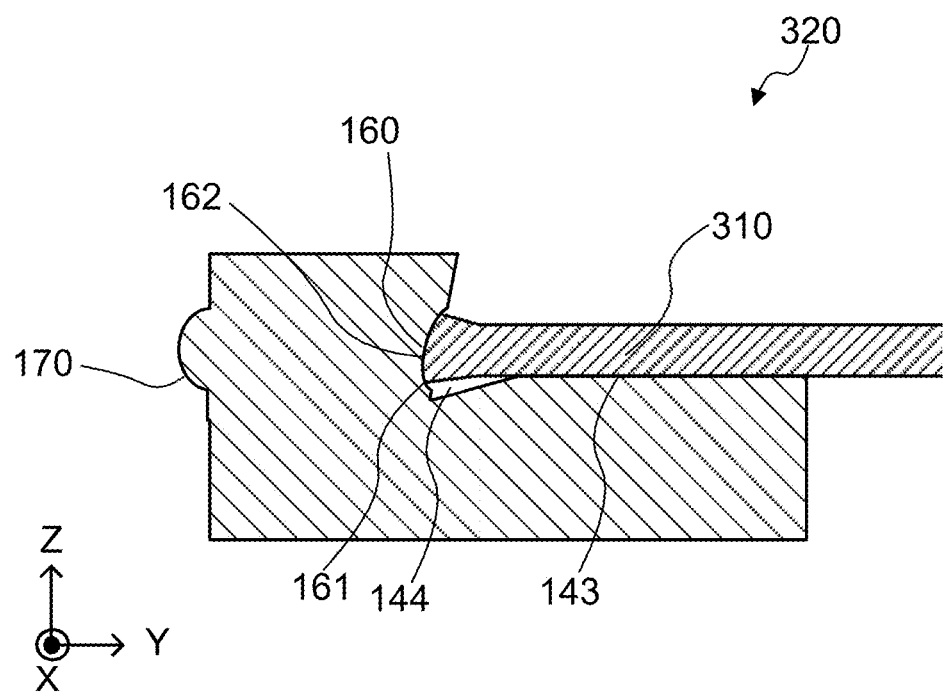
FIGS. 21A and 21B are cross-sectional schematic diagrams illustrating the optical module according to the variation.
Figure 21B:
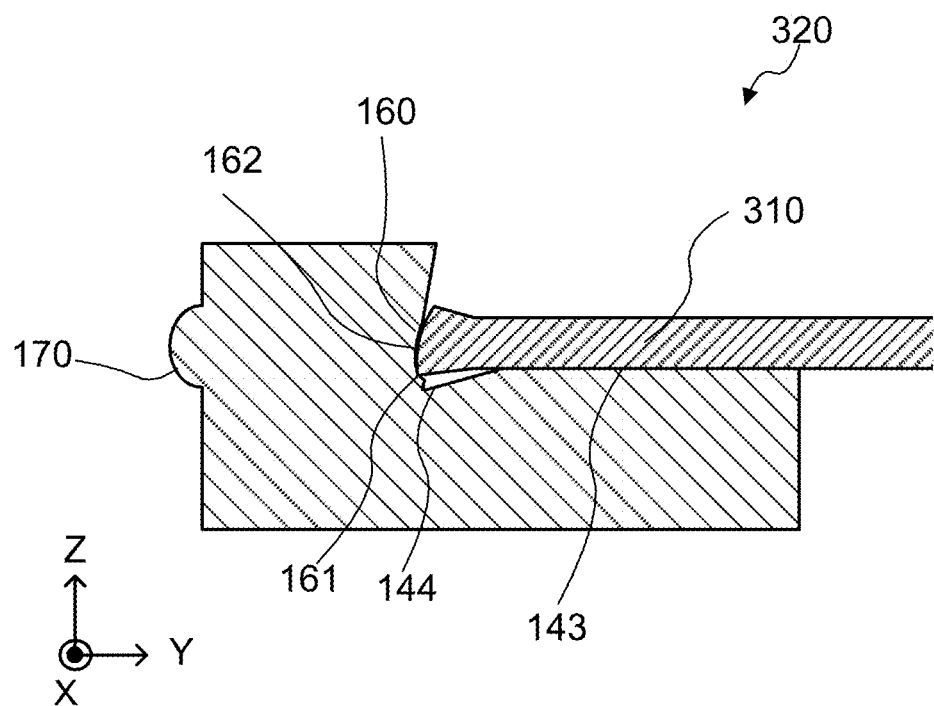

FIG. 18A is a plan view, FIG. 18B is a bottom view, FIG. 19A is a front view, and FIG. 19B is a rear view all illustrating optical connector 320. FIG. 20A is a cross-sectional view taken along line A-A of FIG. 18A, and FIG. 20B is an enlarged view of part of FIG. 20A. FIGS. 21A and 21B are cross-sectional schematic diagrams illustrating a part of an optical module corresponding to the enlarged part of FIG. 20B.

As illustrated in FIGS. 20B and 21A, optical connector 320 includes first recess 144 disposed between first optical portion 160 and the plurality of grooves 143. In addition, first optical portion 160 of optical connector 320 may include support portion 161 for supporting the lower portion of the end surfaces of optical transmission members 310. First optical portion 160 may include second recess 162 for positioning the end surfaces of optical transmission members 310. The configurations of these components will be described below.

First recess 144 is disposed between first optical portion 160 and the plurality of grooves 143. First recess 144 accommodates the swollen portions of the end portions of optical transmission members 310 when the end surfaces of optical transmission members 310 are positioned so as to abut against first optical portion 160. This configuration can prevent optical transmission members 310 from floating upward, thereby disposing the optical transmission members at the correct positions.

First recess 144 may have any configuration as long as the first recess can exhibit the above functions. In the present variation, first recess 144 includes an inclined surface that is inclined so as to approach the back surface as the surface approaches first optical portion 160. First recess 144 may have any depth and length as long as the first recess can accommodate the swollen portions of the end portions of optical transmission members 310. The depth and length of first recess 144 may be appropriately set according to the swollen portions of the end portions of optical transmission members 310. In addition, as illustrated in FIG. 18A, first recess 144 is a groove extending in the first direction (X direction) in the present variation.

Support portion 161 is disposed in first optical portion 160. Support portion 161 is configured to support the lower portions of the end surfaces of optical transmission members 310 when the end surfaces of optical transmission members 310 contact the first optical portion 160. Support portion 161 may have any configuration as long as the support portion can exhibit the above functions.

In the present variation, support portion 161 is a part of below described second recess 162, as illustrated in FIG. 21A. As illustrated in FIG. 21B, support portion 161 may be a protrusion protruding from first optical portion 160. Support portion 161 may be a part of second recess 162, or may be an independent structure.

Second recess 162 is disposed in first optical portion 160 and configured to position the end surfaces of optical transmission members 310. That is, with second recess 162 included, at least part of the end surface of optical transmission member 310 is disposed so as to contact second recess 162. Second recess 162 may have any configuration as long as the second recess can exhibit the above functions. Second recess 162 preferably has a shape complementary to the end surface of optical transmission member 310 for exhibiting the above function. For example, when the end surface of optical transmission member 310 is dome-shaped (convex surface), second recess 162 preferably has a shape of a concave surface complementary to the dome shape.

Specifically, second recess 162 preferably has a portion formed to be arcuate that protrudes toward second optical portion 170. The arcuate portion may be arcuate when viewed from the first direction (X direction), from the second direction (Z direction), or from both the first direction and the second direction. The presence of second recess 162 has the effect of further improving the positional accuracy of optical transmission member 310 with respect to optical connector 320. This effect is maintained even when the angle between the surface (contacting the end surfaces of optical transmission members 310) of first optical portion 160 and the axis of the groove 143 is 90°.

Effect

Optical connector 320 according to the variation can prevent a decrease in positional accuracy, which would be caused during the positioning of optical transmission member 310 with a swollen end surface.

INDUSTRIAL APPLICABILITY

The optical connectors and optical modules according to the present invention are particularly advantageous for optical communications using optical transmission members.

REFERENCE SIGNS LIST 100, 200 Optical module
11, 110, 210, 310 Optical transmission member
12, 120, 220, 320 Optical connector
130, 230 Holding part
140, 240 Holding recess
141 Notch
142, 242 Ridge
143, 243 Groove
144 First recess
150, 250 Lid
151 Lid body
152 Projection
16, 160, 260 First optical portion
161 Support portion
162 Second recess
170, 270 Second optical portion
171, 271 Convex surface
181 Protrusion
182 Recess
183 Engaging protrusion
184 Engaging recess
185 Inward restricting surface
186 Outward restricting surface
187 Contact surface

The invention claimed is:

1. An optical connector for optically coupling optical transmission members to each other, the optical connector comprising:
   a holding part for holding an end portion of an optical transmission member that is one of the optical transmission members;
   a first optical portion for allowing light from an end surface of the optical transmission member held by the holding part to enter an inside of the optical connector, or for emitting light traveling through the inside of the optical connector toward the end surface of the optical transmission member; and
   a second optical portion for allowing light from another optical connector holding another optical transmission member of the optical transmission members to enter the inside of the optical connector, or for emitting light traveling through the inside of the optical connector toward the other optical connector,
   wherein:
   the holding part includes a groove for disposing the optical transmission member in such a way that at least part of the end surface of the optical transmission member contacts the first optical portion, the groove extending in one direction, and
   in a cross section including an axis of the groove and an optical path between the first optical portion and the second optical portion, an angle between a surface of the first optical portion and the axis of the groove is less than 90°, the surface of the first optical portion contacting the at least part of the end surface of the optical transmission member.

2. The optical connector according to claim 1, wherein:
   the groove is disposed on a front side of the optical connector;
   the surface of the first optical portion is inclined with respect to a back surface of the optical connector, the surface of the first optical portion contacting the end surface of the optical transmission member; and
   the axis of the groove is parallel to the back surface of the optical connector.

3. The optical connector according to claim 2, wherein the surface of the first optical portion is inclined so as to approach the second optical portion as the surface of the first optical portion approaches the back surface of the optical connector, the surface of the first optical portion contacting the end surface of the optical transmission member.

4. The optical connector according to claim 1, wherein:
   the groove is disposed on a front side of the optical connector;
   the surface of the first optical portion is perpendicular to a back surface of the optical connector, the surface of the first optical portion contacting the end surface of the optical transmission member; and
   the axis of the groove is inclined with respect to the back surface of the optical connector.

5. The optical connector according to claim 4, wherein the axis of the groove is inclined so as to approach the back surface of the optical connector as the axis approaches the first optical portion.

6. The optical connector according to claim 1, further comprising, a first recess disposed between the groove and the first optical portion.

7. The optical connector according to claim 1, wherein the first optical portion includes a support portion for supporting a lower portion of the end surface of the optical transmission member.

8. The optical connector according to claim 1, wherein the first optical portion includes a second recess for positioning the end surface of the optical transmission member.

9. An optical module, comprising:
- an optical transmission member; and
- the optical connector according to claim 1, wherein
- the at least part of the end surface of the optical transmission member is in contact with the first optical portion of the optical connector.

10. The optical module according to claim 9, wherein the optical module is configured in such a way that when two of the optical modules are optically coupled, a central axis of the optical transmission member in one of the two optical modules and a central axis of the optical transmission member in the other of the two optical modules are not located on a single straight line.

* * * * *